(12) United States Patent
Nakamura et al.

(10) Patent No.: US 10,987,903 B2
(45) Date of Patent: Apr. 27, 2021

(54) LAMINATED GLASS

(71) Applicant: AGC Inc., Chiyoda-ku (JP)

(72) Inventors: Atsushi Nakamura, Chiyoda-ku (JP);
Keiji Notsu, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 129 days.

(21) Appl. No.: 15/997,881

(22) Filed: Jun. 5, 2018

(65) Prior Publication Data

US 2018/0281351 A1  Oct. 4, 2018

Related U.S. Application Data

(63) Continuation of application No. PCT/JP2016/086510, filed on Dec. 8, 2016.

(30) Foreign Application Priority Data

Dec. 8, 2015 (JP) .............................. JP2015-239137

(51) Int. Cl.
| | |
|---|---|
| *B32B 17/10* | (2006.01) |
| *B60J 1/08* | (2006.01) |
| *B32B 7/02* | (2019.01) |
| *B32B 7/027* | (2019.01) |

(52) U.S. Cl.
CPC .......... *B32B 17/10036* (2013.01); *B32B 7/02* (2013.01); *B32B 7/027* (2019.01); *B32B 17/1011* (2013.01); *B32B 17/10633* (2013.01); *B32B 17/10761* (2013.01); *B60J 1/08* (2013.01); *B32B 2250/05* (2013.01); *B32B 2307/102* (2013.01); *B32B 2307/30* (2013.01);
(Continued)

(58) Field of Classification Search
CPC ........................................ B32B 17/10–17/1099
See application file for complete search history.

(56) References Cited

U.S. PATENT DOCUMENTS

| | | |
|---|---|---|
| 2002/0150744 A1 | 10/2002 | Nagai |
| 2004/0157048 A1 | 8/2004 | Nagai |
| 2012/0021231 A1 | 1/2012 | Hirota et al. |

(Continued)

FOREIGN PATENT DOCUMENTS

| | | |
|---|---|---|
| CN | 105939979 | 9/2016 |
| CN | 105939980 | 9/2016 |

(Continued)

OTHER PUBLICATIONS

Machine translation of JPH05-330864. Retrieved Sep. 3, 2020.*

(Continued)

*Primary Examiner* — Prashant J Khatri
(74) *Attorney, Agent, or Firm* — Oblon, McClelland, Maier & Neustadt, L.L.P.

(57) ABSTRACT

There is provided a laminated glass excellent in sound insulating property. A laminated glass includes: a pair of glass plates facing each other; and an intermediate film sandwiched between the pair of glass plates, including alternately laminated at least one skin layer and two or more core layers, wherein the skin layer has a glass transition point of 15° C. or higher, and each of the core layers has a glass transition point of less than 15° C., and a ratio of a mass of the intermediate film with respect to a total mass of the intermediate film and the pair of glass plates is 14 mass % or more.

20 Claims, 3 Drawing Sheets

(52) U.S. Cl.
CPC ..... *B32B 2329/06* (2013.01); *B32B 2605/006* (2013.01)

(56) References Cited

U.S. PATENT DOCUMENTS

| | | | | |
|---|---|---|---|---|
| 2012/0025559 | A1* | 2/2012 | Offermann | B32B 17/10036 296/84.1 |
| 2017/0106633 | A1* | 4/2017 | Lu | B32B 27/18 |

FOREIGN PATENT DOCUMENTS

| | | |
|---|---|---|
| CN | 105980325 | 9/2016 |
| EP | 3 106 443 A1 | 12/2016 |
| EP | 3 124 451 A1 | 2/2017 |
| EP | 3 124 452 A1 | 2/2017 |
| JP | H05-330864 | 12/1993 |
| JP | 2002-326847 | 11/2002 |
| JP | 2006-248826 | 9/2006 |
| JP | 2015-151308 | 8/2015 |
| JP | 5838011 | 12/2015 |
| KR | 10-2016-0138378 | 12/2016 |
| KR | 10-2016-0140581 | 12/2016 |
| WO | WO 2010/095749 A1 | 8/2010 |
| WO | WO 2015/122507 A1 | 8/2015 |
| WO | WO 2015/147303 A1 | 10/2015 |

OTHER PUBLICATIONS

International Search Report dated Mar. 14, 2017 in PCT/JP2016/086510 filed Dec. 8, 2016 (with English Translation).
Written Opinion dated Mar. 14, 2017 in PCT/JP2016/086510 filed Dec. 8, 2016.
Chinese office action in corresponding patent application No. 201680071680.3, dated Apr. 29, 2020.

* cited by examiner

LAMINATED GLASS

CROSS-REFERENCE TO RELATED APPLICATIONS

This application is a continuation of prior International Application No. PCT/JP2016/086510, filed on Dec. 8, 2016 which is based upon and claims the benefit of priority from Japanese Patent Application No. 2015-239137, filed on Dec. 8, 2015; the entire contents of all of which are incorporated herein by reference.

FIELD

The present invention relates to a laminated glass, and particularly to a laminated glass with high sound insulating property.

BACKGROUND

Since a laminated glass including an intermediate film made of resin or the like sandwiched between a pair of glass plates and compression bonded under heating is excellent in safety without scattering of fragments when broken, it is widely used for, for example, window glass of a vehicle such as an automobile, window glass for a building, and the like. In recent years, a laminated glass having various functions imparted according to required functions has been used by appropriately selecting an intermediate film, in addition to the safety such as scattering prevention. There is high desire for a laminated glass having sound insulating property among the functions, and it is therefore attempted to increase sound insulating performance of the laminated glass by using an intermediate film made by laminating resin films different in properties.

For example, Patent Reference 1 (International Publication Pamphlet No. 2010/095749) describes a laminated glass using an intermediate film having a constitution where two kinds of sound insulating layers containing a polyvinyl acetal resin and a plasticizer at different ratios sandwich an intermediate layer containing the polyvinyl acetal resin and the plasticizer and having a different acetyl group amount from the sound insulating layers, and further using an intermediate film having a constitution where the intermediate film is sandwiched with surface protection layers similar to the intermediate layer. The laminated glass described in Patent Reference 1 exerts a sound insulating property at a certain level or more at a temperature range of 10 to 60° C., but does not have a particularly excellent sound insulating property.

SUMMARY

The present invention has been made from the above-described viewpoints, and an object thereof is to provide a laminated glass with high sound insulating property.

A laminated glass of the present invention includes: a pair of glass plates facing each other; and an intermediate film sandwiched between the pair of glass plates, including alternately laminated at least one skin layer and two or more core layers, wherein the skin layer has a glass transition point of 15° C. or higher, and each of the core layers has a glass transition point of less than 15° C., and a ratio of a mass of the intermediate film with respect to a total mass of the intermediate film and the pair of glass plates is 14 mass % or more.

According to the present invention, a laminated glass with high sound insulating property can be provided.

DETAILED DESCRIPTION

Figure 1A:
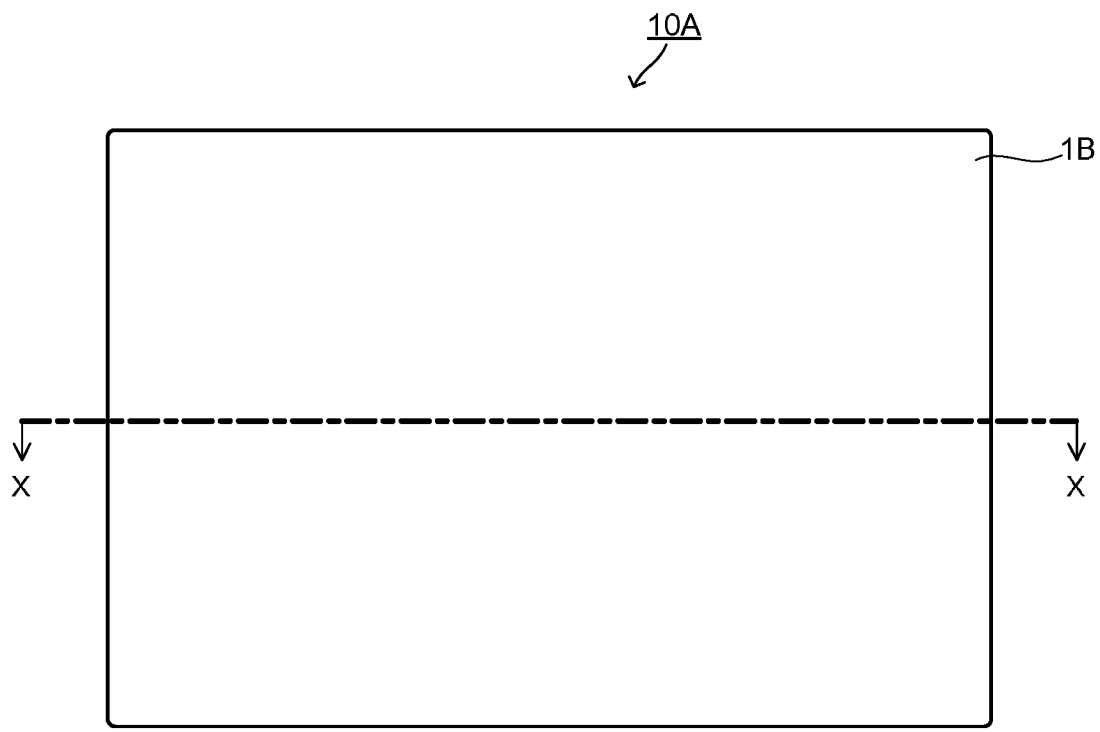
FIG. 1A is a front view of an example of an embodiment of a laminated glass of the present invention.

Hereinafter, embodiments of the present invention will be described. It should be noted that the present invention is not limited to these embodiments, and these embodiments may be changed or modified without departing from the spirit and scope of the present invention.

A laminated glass of the present invention includes: a pair of glass plates facing each other; and an intermediate film sandwiched between the pair of glass plates and having a constitution as described below, wherein a ratio of a mass of the intermediate film with respect to a total mass of the intermediate film and the pair of glass plates is 14 mass % or more. The intermediate film has the constitution where at least one skin layer and two or more core layers are alternately laminated, the skin layer has a glass transition point of 15° C. or higher, and each of the core layers has a glass transition point of less than 15° C.

Here, the glass transition point in this specification means a peak temperature of tan δ when measuring temperature dependency of tan δ (loss modulus/storage modulus) of a sample formed in a disk shape with a thickness d=0.6 mm and a diameter of 12 mm, by using a dynamic viscoelasticity measurement apparatus under conditions at a frequency of 1 Hz, a swing angle gamma of 0.015%, parallel-plate (diameter of 12 mm) as a measuring jig, a temperature increasing rate of 3° C./min, and a measured temperature range of −40° C. to 80° C. Note that, for example, Rotational Rheometer MCR 301 manufactured by Anton Paar Co., Ltd. can be cited as the dynamic viscoelasticity measurement apparatus.

The laminated glass of the present invention has the constitution where the intermediate film sandwiched between the pair of glass plates includes at least a skin layer with the glass transition point of 15° C. or higher between two core layers with the glass transition point of less than 15° C., and the ratio of the mass of the intermediate film with respect to the total mass of the intermediate film and the pair of glass plates is set to fall within the above-stated range, and thereby, vibrational energy of sound causes large shear deformation energy at a plurality of places of the intermediate film between the pair of glass plates, and the shear deformation energy is emitted as thermal energy, and thereby, sound insulating performance can be exerted.

In the laminated glass of the present invention, the ratio of the mass of the intermediate film with respect to the total mass of the intermediate film and the pair of glass plates (hereinafter, it is also just called an "intermediate film mass %") is more preferably 15 mass % or more, and further preferably 17 mass % or more in view of the sound insulating property and reduction in weight. It is preferably 50 mass % or less, and more preferably 40 mass % or less in view of keeping desired strength.

A surface density of the laminated glass of the present invention is preferably 13.5 kg/m$^2$ or less, more preferably 12 kg/m$^2$ or less, and further preferably 11 kg/m$^2$ or less. As long as the surface density of the laminated glass falls within the above range, the reduction in weight of the laminated glass can be achieved. The surface density of the laminated glass of the present invention is preferably 8 kg/m$^2$ or more, and more preferably 9 kg/m$^2$ or more in view of keeping the desired strength.

The intermediate film mass % and the surface density of the laminated glass are values measured as a whole of the laminated glass.

Figure 1B:
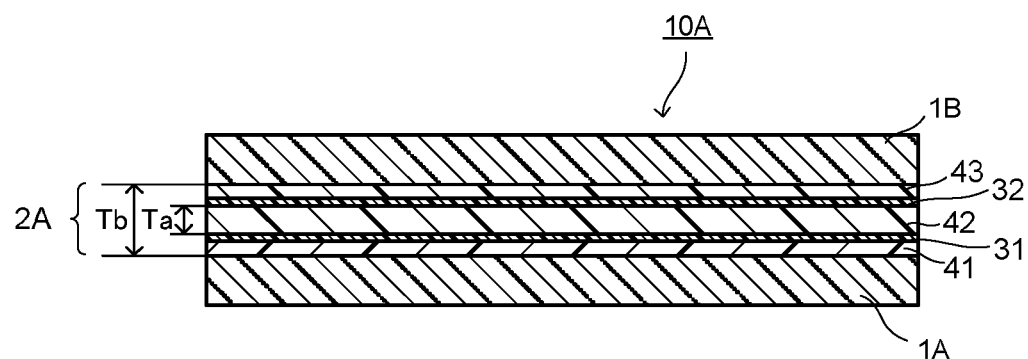
FIG. 1B is a cross-sectional view taken along a line X-X of the laminated glass illustrated in FIG. 1A.
Figure 2:
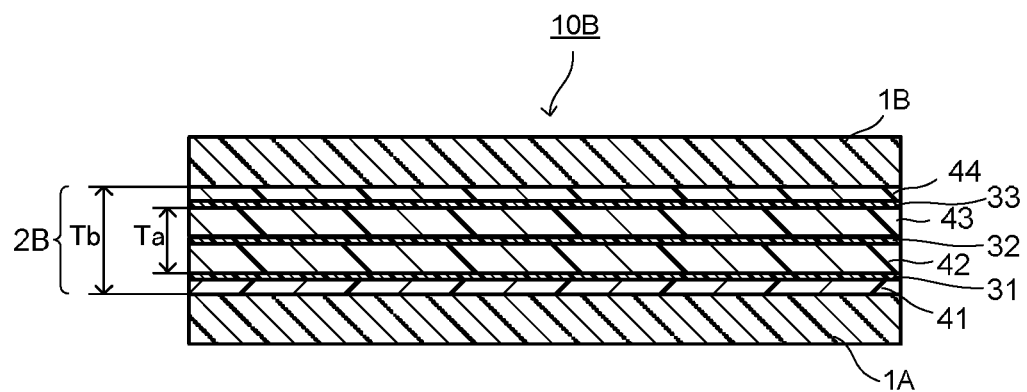
FIG. 2 is a cross-sectional view of another example of the embodiment of the laminated glass of the present invention.

The following describes embodiments of the laminated glass of the present invention while using a case when a five-layer laminated film or a seven-layer laminated film is used as the intermediate film with reference to the drawings. FIG. 1A is a front view of an example of the embodiment of the laminated glass of the present invention where the five-layer laminated film is used as the intermediate film, and FIG. 1B is a cross-sectional view taken along a line X-X of the laminated glass illustrated in FIG. 1A. FIG. 2 is a cross-sectional view of an example of the embodiment of the laminated glass of the present invention where the seven-layer laminated film is used as the intermediate film.

A laminated glass 10A illustrated in FIG. 1 has a pair of glass plates 1A and 1B facing each other, and an intermediate film 2A which is disposed to be sandwiched between the pair of glass plates 1A and 1B. The intermediate film 2A has a constitution where five layers are laminated in an order of a skin layer 41, a core layer 31, a skin layer 42, a core layer 32, and a skin layer 43 from the glass plate 1A side toward the glass plate 1B side. The laminated glass 10A has a principal surface with substantially the same shape and dimensions as those of the pair of glass plates 1A and 1B, the two core layers 31 and 32, and the three skin layers 41, 42 and 43 constituting the intermediate film.

Note that "substantially the same shape and dimensions" in this specification means to have the same shape and the same dimensions as viewed by people, and for example, when an outer peripheral shape of one does not have unevenness such as a cutout, and the other has a minute cutout or the like at a part of the outer peripheral shape, the two have substantially the same shape and dimensions. In other cases, "substantially" also indicates the same meaning as above. The following describes each element constituting the laminated glass 10A.

[Glass Plate]

Plate thicknesses of the pair of glass plates 1A and 1B in the laminated glass 10A are not particularly limited as long as they are the thicknesses where the intermediate film mass % falls within a predetermined range though they depend on a material of the used glass plates and the intermediate film to be combined. The plate thicknesses of the glass plates 1A and 1B can be appropriately selected depending on use of the laminated glass 10A, and it is generally set to be 0.1 to 10 mm. The plate thicknesses of the glass plates 1A and 1B are preferably 0.3 to 2.5 mm to make the surface density of the laminated glass 10A fall within the above-stated preferable range.

The plate thicknesses of the pair of glass plates 1A and 1B may be the same or different from each other. When the plate thicknesses are different in the glass plates 1A and 1B, the plate thickness of the glass plate located inside in the case where the laminated glass 10A is installed at a window or the like, for example, a vehicle-interior side when it is window glass of an automobile, or on an indoor side when it is window glass of a building, is preferably smaller than the plate thickness of the glass plate located outside.

For example, in the laminated glass 10A, when the glass plate located inside in use is the glass plate 1A, the plate thickness of the glass plate 1A is preferably 0.5 mm to 1.6 mm, and more preferably 0.7 mm to 1.5 mm. The plate thickness of the glass plate 1A is preferably smaller than the plate thickness of the glass plate 1B. A difference between the plate thickness of the glass plate 1A and the plate thickness of the glass plate 1B is preferably 0.3 to 1.5 mm, and more preferably 0.5 to 1.3 mm. In this case, the glass plate 1B is the glass plate located outside, and the plate thickness thereof is preferably 1.6 mm to 2.5 mm, and more preferably 1.7 mm to 2.1 mm.

The glass plate located outside having a plate thickness larger than that of the glass plate located inside in use of the laminated glass is preferable in terms of flying stone impact resistance. In particular, the plate thickness on the outside is preferably 1.3 mm or more.

Examples of materials of the glass plates 1A and 1B used for the laminated glass 10A include transparent inorganic glass and organic glass (resin). As the inorganic glass, ordinary soda lime glass (also referred to as soda lime silicate glass), aluminosilicate glass, borosilicate glass, non-alkali glass, quartz glass and the like are used without any particular limitation. Among them, soda lime glass is particularly preferable. Its forming method is also not particularly limited and, for example, float plate glass formed by a float method or the like may be used. Further, the glass plates 1A and 1B have been preferably subjected to strengthening such as thermally tempering or chemical strengthening.

Examples of the organic glass (resin) include a polycarbonate resin, a polystyrene resin, an aromatic polyester resin, an acrylic resin, a polyester resin, a polyarylate resin, a polycondensate of halogenated bisphenol A and ethylene glycol, an acrylic urethane resin, a halogenated aryl group-containing acrylic resin and the like. Among them, the polycarbonate resin such as an aromatic polycarbonate resin and the acrylic resin such as a polymethyl methacrylate-based acrylic resin are preferable, and the polycarbonate resin is more preferable. Further, among the polycarbonate resins, a bisphenol A-based polycarbonate resin is particularly preferable. Note that the glass plate may be formed by containing two or more kinds of the above-described resins.

The glass plates 1A and 1B may be glass plates with infrared absorbency and/or ultraviolet absorbency imparted by containing an infrared absorbent and/or an ultraviolet absorbent in the above-described inorganic glass or organic glass (resin). As such a glass plate, a green glass plate, an ultraviolet-absorbing (UV) green glass plate, or the like can be used. Note that the UV green glass plate indicates ultraviolet-absorbing green glass containing 68 mass % or more and 74 mass % or less of $SiO_2$, 0.3 mass % or more and 1.0 mass % or less of $Fe_2O_3$, and 0.05 mass % or more and 0.5 mass % or less of FeO, and having ultraviolet transmittance at a wavelength of 350 nm of 1.5% or less and a minimum value of transmittance in a region of 550 nm or more and 1700 nm or less.

As the above-described glass, a colorless and transparent material with no coloring component added thereto may be used, or a colored and transparent material colored like the above-described green glass within the range not impairing the effect of the present invention may be used. Moreover, one kind of glass may be used or two or more kinds of glass may be used in combination, and for example, a laminated substrate made by laminating two or more layers may be used. Though depending on the application place of the laminated glass, the inorganic glass is preferable as glass.

The pair of glass plates 1A and 1B used for the laminated glass 10A may be made of different kinds of materials from each other, and are preferably made of the same kind of material. A shape of the glass plates 1A and 1B may be flat or may entirely or partially have a curvature. The glass plates 1A and 1B may have a coating that imparts a water repellent function, a hydrophilic function, an antifogging function and the like to a surface exposed to the atmosphere. Further, facing surfaces of the glass plates 1A and 1B facing each other may have functional coatings including ordinary metal layers such as a low-emissivity coating, an infrared cut coating, and a conductive coating.

Note that in the case where the facing surfaces of the glass plates 1A and 1B have the above-described functional coatings, the following skin layers 41 and 43 of the intermediate film 2A are constituted to be in contact with the functional coatings on the facing surfaces of the glass plates 1A and 1B.

[Intermediate Film]

The intermediate film 2A in the laminated glass 10A has a constitution where five layers are laminated in the order of the skin layer 41, the core layer 31, the skin layer 42, the core layer 32, and the skin layer 43 from the glass plate 1A side toward the glass plate 1B side. The intermediate film 2A is disposed between glass plates 1A and 1B, and has a function of bonding the glass plates 1A and 1B to integrate them as the laminated glass 10A.

The glass transition point of each of the core layers 31 and 32 is less than 15° C., and the glass transition point of each of the skin layers 41, 42 and 43 is 15° C. or higher. The core layers 31 and 32, and the skin layers 41, 42 and 43 are each formed by appropriately selecting resins from thermoplastic resins being major materials forming the intermediate film normally used for the laminated glass so as to obtain the above-stated glass transition point by each layer. The kind of the thermoplastic resin to be used is not particularly limited as long as the glass transition point is adjusted to be above range. Hereinafter, the glass transition point of the core layer is sometimes called Tgc, and the glass transition point of the skin layer is sometimes called Tgs.

Tgc is preferably 10° C. or less, and more preferably 8° C. or less. When Tgc is less than 15° C., desired sound insulating performance can be obtained in the laminated glass. Tgc is preferably −10° C. or higher and more preferably 0° C. or higher in view of shape retention of the core layer in itself.

Tgs is preferably 20° C. or higher, and more preferably 25° C. or higher. When Tgs is 15° C. or higher, desired sound insulating performance can be obtained in the laminated glass. Tgs is preferably 50° C. or less, and more preferably 40° C. or less in view of penetration resistance.

In view of increasing the sound insulating property, a value obtained by subtracting Tgc from Tgs is preferably 10 to 40° C., and more preferably 20 to 35° C.

Examples of the thermoplastic resins capable of enabling the above-stated Tgc in the core layer and the above-stated Tgs in the skin layer respectively specifically include thermoplastic resins such as a polyvinyl acetal resin such as a polyvinyl butyral resin (PVB), a polyvinyl chloride resin (PVC), a saturated polyester resin, a polyurethane resin, an ethylene-vinyl acetate copolymer resin (EVA), an ethylene-ethyl acrylate copolymer resin, and a cycloolefin polymer (COP). Tgc or Tgs can be adjusted to fall within the above ranges by, for example, adjusting an amount of a plasticizer or the like of these thermoplastic resins. The thermoplastic resins may be used independently or two or more kinds may be used in combination.

The thermoplastic resins are selected according to purposes of the laminated glass and in consideration of balance among various performances such as transparency, weather resistance, adhesive strength, penetration resistance, impact energy absorbency, moisture resistance, heat insulating property in addition to the conditions of Tgc and Tgs in the core layer and the skin layer, respectively. From the above viewpoint, PVB, EVA, the polyurethane resin and the like are preferable as the thermoplastic resin forming the core layer. Besides, PVB, EVA, the polyurethane resin and the like are preferable as the skin layer.

Tgc of the two or more core layers constituting the intermediate film may be the same or different as long as Tgc is in the above-described range in each core layer. When the intermediate film has a plurality of skin layers, Tgs of the skin layers may be the same or different as long as Tgs is in the above-described range in each skin layer. Further, kinds of the thermoplastic resins forming the core layer and the skin layer may be the same or different by each of the core layer and the skin layer. The intermediate film preferably has a constitution in which Tgc and the kind of the thermoplastic resin of the two or more core layers are the same, Tgs and the kind of the thermoplastic resin of the plurality of skin layers are the same when the plurality of skin layers are provided, and the kinds of the thermoplastic resins of the core layers and the skin layers are the same.

In the laminated glass of the present invention, the intermediate film has a constitution where at least one skin layer and two or more core layers are alternately laminated, each of the core layers satisfies the above-described Tgc and the skin layer satisfies the above-described Tgs. The number of layers is not particularly limited as long as the intermediate film mass % in the relation between the intermediate film and the glass plates is 14 mass % or more, and the aforementioned laminated structure is held. A constitution where the number of layers is the smallest in the intermediate film is a constitution where the skin layer is sandwiched between a pair of the core layers. In this case, the laminated glass has the laminated structure of the glass plate, the core layer, the skin layer, the core layer, and the glass plate.

The intermediate film preferably has a constitution where the skin layers are held to be in contact with facing surfaces of the pair of glass plates in view of workability at a manufacturing time of the laminated glass. In the intermediate film, the sound insulating performance of the laminated glass can be designed while using a distance between a pair of the core layers which are the closest to the pair of glass plates (hereinafter, it is also called "a distance between outermost core layers") as an index. Further, in the intermediate film, the sound insulating performance of the laminated glass can also be designed while using a surface density of all of the layers which are disposed between the pair of core layers which are the closest to the pair of glass plates (hereinafter, it is also called "a surface density between outermost core layers") as an index.

A constitution with the smallest number of layers as the intermediate film having the laminated structure including the skin layers to be in contact with the facing surfaces of the pair of glass plates and including the two or more core layers is a constitution of the intermediate film 2A illustrated in FIG. 1B where five layers of the skin layer 41, the core layer 31, the skin layer 42, the core layer 32, and the skin layer 43 are laminated. The core layers 31 and 32, and the skin layers 41, 42 and 43 may have a single-layer structure or a multilayer structure as long as each of the core layers and the skin layers satisfies the aforementioned Tgc and Tgs.

A distance between the pair of core layers 31 and 32 which are each the closest to the pair of glass plates 1A and 1B in the intermediate film 2A is denoted by Ta in FIG. 1B. A thickness of the intermediate film 2A is denoted by Tb in FIG. 1B. The distance Ta between the outermost core layers is preferably 0.45 mm or more, and more preferably 0.50 mm or more in a viewpoint where the intermediate film undergoes sufficient shear deformation, thus improving the sound insulating performance of the laminated glass. Though an upper limit of the distance Ta between the outermost core layers is not particularly limited, Ta is preferably 4.0 mm or less, and more preferably 3.0 mm or less in view of reduction in weight. In the laminated glass 10A, the distance Ta between the outermost core layers is equal to a thickness of the skin layer 42.

The surface density between the outermost core layers in the intermediate film 2A is a surface density of the skin layer 42. The surface density between the outermost core layers in the intermediate film is preferably 0.5 $kg/m^2$ or more, more preferably 0.55 $kg/m^2$ or more, and further preferably 0.6 $kg/m^2$ or more in a viewpoint where the intermediate film undergoes sufficient shear deformation, thus improving the sound insulating performance of the laminated glass similar to the distance Ta between the outermost core layers. Though an upper limit of the surface density between the outermost core layers is not particularly limited, the surface density is preferably 3.3 $kg/m^2$ or less, more preferably 2.0 $kg/m^2$ or less, and further preferably 1.3 $kg/m^2$ or less in view of reduction in weight.

The thickness Tb of the intermediate film 2A is a sum of the thicknesses of the core layers 31 and 32, and the skin layers 41, 42 and 43, and it is preferably 1.53 mm or more, and more preferably 2.0 mm or more in view of setting the intermediate film mass % to fall within the aforementioned range and the sound insulating property. Though an upper limit of the thickness Tb of the intermediate film 2A is not particularly limited, Tb is preferably 4.0 mm or less in view of reduction in weight.

The thicknesses of the core layers 31 and 32 are not particularly limited. They are each preferably 0.05 to 0.2 mm, and more preferably 0.07 to 0.15 mm in view of the sound insulating property and the reduction in weight of the laminated glass, and setting Ta and Tb to fall within the aforementioned ranges, and so on. The thicknesses of the core layers 31 and 32 may be the same or different from each other. The thicknesses of the skin layer 41 and the skin layer 43 respectively located between the pair of core layers 31 and 32 which are each the closest to the pair of glass plates 1A and 1B of the intermediate film 2A and the pair of glass plates 1A and 1B are not particularly limited, and they are each preferably 0.15 to 1.1 mm, more preferably 0.2 to 0.76 mm, and further preferably 0.2 to 0.45 mm in view of the sound insulating property and the reduction in weight of the laminated glass, and setting Ta and Tb to fall within the aforementioned ranges, and so on.

FIG. 1B is a view illustrating a cross-section perpendicular to a principal surface of the laminated glass 10A, to show that the glass plates 1A and 1B and the intermediate film 2A are laminated each with a uniform thickness between one end part to the other end part of the laminated glass. In the laminated glass 10A, all of the cross-sections perpendicular to the principal surface are the same. That is, in the laminated glass 10A, the thickness of each layer, and Ta and Tb are the same at any place within the principal surface.

In the laminated glass of the present invention, the intermediate film preferably has three or more core layers because the distance between the pair of core layers which are each the closest to the pair of glass plates is easily adjustable in the aforementioned range. The number of core layers is preferably five layers or less in view of easiness at the manufacturing time of the intermediate film. The laminated glass preferably has the skin layers to be in contact with the facing surfaces of the pair of glass plates even when the number of core layers of the intermediate film is three layers or more.

A constitution of the intermediate film in the laminated structure having the skin layers to be in contact with the facing surfaces of the pair of glass plates and three or more core layers, where the number of layers is the smallest, is a constitution of an intermediate film 2B held by a laminated glass 10B illustrated in FIG. 2 where seven layers of the skin layer 41, the core layer 31, the skin layer 42, the core layer 32, the skin layer 43, a core layer 33, and a skin layer 44 are laminated. In the laminated glass 10B, the pair of core layers which are respectively the closest to the pair of glass plates 1A and 1B in the intermediate film 2B are the core layer 31 which is the closest to the glass plate 1A and the core layer 33 which is the closest to the glass plate 1B. In the intermediate film 2B, a distance between the core layer 31 and the core layer 33 is Ta, and a sum of thicknesses of the skin layer 42, the core layer 32, and the skin layer 43 is the distance Ta between the outermost core layers. A surface density between the outermost core layers in the intermediate film 2B is a surface density of three layers where the skin layer 42, the core layer 32, and the skin layer 43 are laminated.

Preferable ranges of the distance between the outermost core layers and the surface density between the outermost core layers in the intermediate film according to the laminated glass of the present invention are as described above regardless of a layer constitution between the outermost core layers. That is, the distance Ta between the outermost core layers and the surface density between the outermost core layers in the intermediate film 2B can be set to be similar to the distance Ta between the outermost core layers and the surface density between the outermost core layers of the intermediate film 2A including the preferable value.

The thickness Tb of the intermediate film 2B is a sum of thicknesses of the core layers 31, 32 and 33, and the skin layers 41, 42, 43 and 44, and it can be set to be similar to the thickness Tb of the intermediate film 2A including the preferable range. The thicknesses of the core layers 31, 32 and 33 in the intermediate film 2B are each preferably 0.05 to 0.2 mm, and more preferably 0.07 to 0.15 mm in view of the sound insulating property and the reduction in weight of the laminated glass, and setting Ta and Tb to fall within the aforementioned ranges, and so on. The thicknesses of the skin layers 41, 42, 43 and 44 in the intermediate film 2B are each preferably 0.15 to 1.1 mm, more preferably 0.2 to 0.76 mm, and further preferably 0.2 to 0.45 mm in the same viewpoint as above. The thicknesses of the core layers may be the same or different from each other, and the thicknesses of the skin layers may be the same or different from each other.

In the laminated glass 10B, other constitutions can be set to be the same as the laminated glass 10A except that the laminated constitution of the intermediate film 2B is different from the laminated constitution of the intermediate film 2A of the laminated glass 10A.

For fabrication of the core layers and the skin layers in the intermediate film, a thermoplastic resin-containing composition containing the above-described thermoplastic resin as a main component is used. The thermoplastic resin-containing composition may contain, for example, one kind or two or more kinds of various additives such as an infrared absorbent, an ultraviolet absorbent, a fluorescer, an adhesion regulator, a coupling agent, a surfactant, an antioxidant, a heat stabilizer, a light stabilizer, a dehydrating agent, a defoaming agent, an antistatic agent, and a flame retarder within the range not impairing the effect of the present invention according to various purposes. These additives may be entirely uniformly contained in each of the core layers and the skin layers.

Note that regarding the additives such as the infrared absorbent, the ultraviolet absorbent, and the fluorescer, in particular, among the above-described additives, which are contained for imparting additional functions to the core layer and the skin layer, for example, only one layer or two or more layers may contain the additives in the layers of the intermediate film 2A of the laminated glass 10A formed of five layers in total of the core layers 31 and 32, and the skin layers 41, 42 and 43. Further, when two or more layers contain the additives, the two or more layers may contain the same kind of additive in the same amount or in different amounts, and may contain different additives respectively.

The intermediate film 2A is fabricated by preparing the core layers 31 and 32, and the skin layers 41, 42 and 43 formed into sheet shapes from the thermoplastic resin-containing compositions suitable for them respectively such that the thicknesses of the layers when they are finally formed into the laminated glass preferably fall within the above-described ranges, laminating the obtained layers in the order of the skin layer 41, the core layer 31, the skin layer 42, the core layer 32, and the skin layer 43, and heating them under pressure. Alternatively, the intermediate film 2A may be integrally fabricated by coextrusion. The fabrication conditions are appropriately selected depending on the kind of the thermoplastic resin. The intermediate film 2B can be similarly fabricated.

The intermediate film in the laminated glass of the present invention has been described above using the intermediate films 2A and 2B as examples in the case where two core layers are provided and the case where three core layers are provided. Also in an intermediate film in the case where four or more core layers are provided, the core layers and the skin layers only need to be designed appropriately similarly to the above in consideration of the intermediate film mass %, the distance Ta between the outermost core layers, the surface density between the outermost core layers, and the thickness Tb of the intermediate film.

The intermediate film in the laminated glass of the present invention may be the one where each layer has a uniform thickness within the principal surface of the laminated glass as in the intermediate films 2A and 2B, or may be the one where each layer has different thicknesses within the principal surface. In this case, the thickness of each layer, the distance Ta between the outermost core layers, and the thickness Tb of the intermediate film are designed such that each value measured at a place where the thickness of the intermediate film is the largest falls within the range same as the range when each layer has the uniform thickness within the principal surface of the laminated glass, specifically, the range illustrated in the intermediate films 2A and 2B. Besides, the intermediate film mass % and the surface density are physical properties measured with respect to the whole of the laminated glass as described above.

Figure 3A:
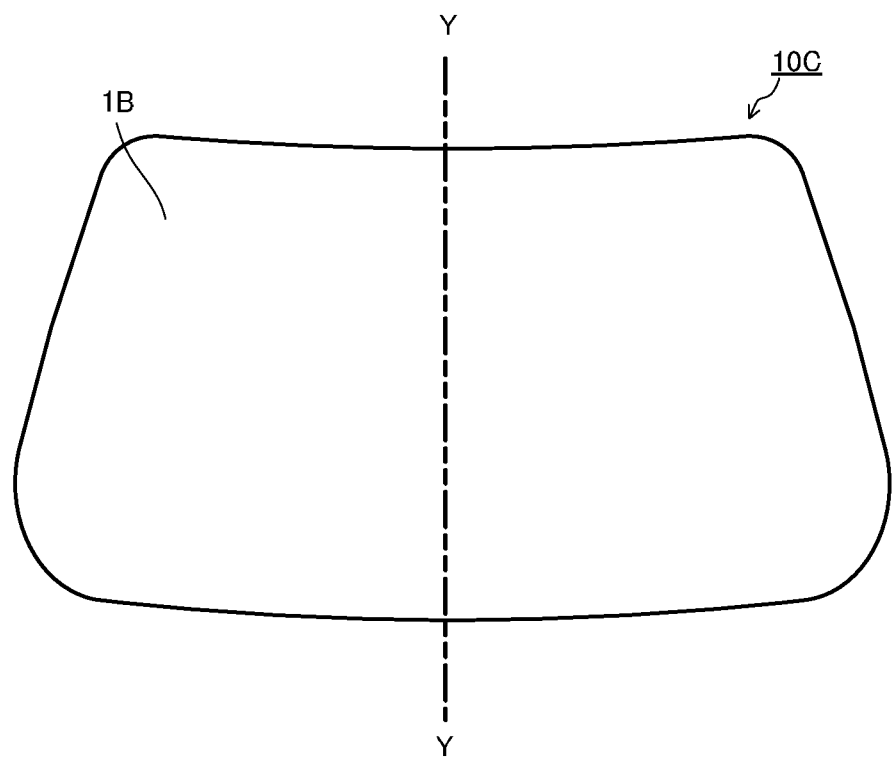
FIG. 3A is a front view of still another example of the embodiment of the laminated glass of the present invention.
Figure 3B:
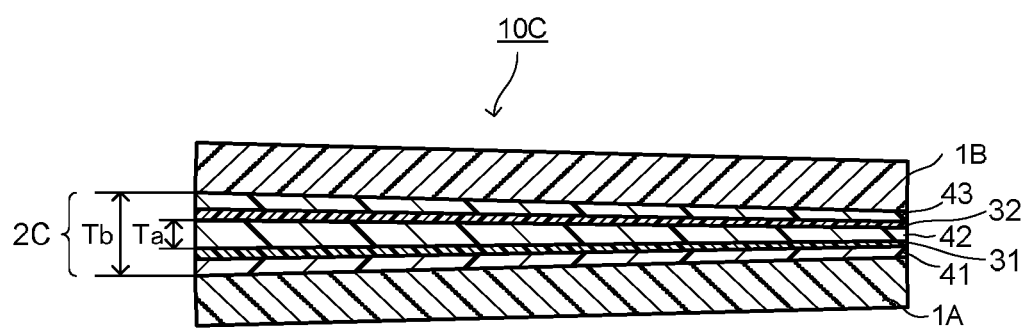
FIG. 3B is a cross-sectional view taken along a line Y-Y of the laminated glass illustrated in FIG. 3A.

FIG. 3A is a front view of another example of the embodiment of the laminated glass of the present invention using the five-layer laminated film as the intermediate film, and FIG. 3B is a cross-sectional view taken along a line Y-Y of the laminated glass illustrated in FIG. 3A. A laminated glass 10C illustrated in FIG. 3A is the laminated glass used as, for example, a windshield of an automobile. In FIG. 3A, an upper side of the laminated glass 10C is attached to the automobile as an upper side of the windshield. Hereinafter, an edge on the upper side of the laminated glass 10C is referred to as an upper edge, and an edge on the lower side is referred to as a lower edge. In the cross-sectional view of the laminated glass 10C illustrated in FIG. 3B, the left side is the upper edge side, and the right side is the lower edge side.

As illustrated in FIG. 3A, a principal surface of the laminated glass 10C has a shape of a substantially trapezoid having a lower edge longer than an upper edge. As illustrated in FIG. 3B, an intermediate film 2C held by the laminated glass 10C is the intermediate film in so-called a wedge shape gradually reduced in thickness from the upper edge toward the lower edge. A laminated constitution of the intermediate film 2C is a five-layer constitution where the skin layer 41, the core layer 31, the skin layer 42, the core layer 32, and the skin layer 43 are laminated in this order from the glass plate 1A side toward the glass plate 1B side. The intermediate film 2C illustrated in FIG. 3B has the constitution where each of the layers of the skin layer 41, the core layer 31, the skin layer 42, the core layer 32, and the skin layer 43 is gradually reduced in thickness at the same rate from the upper edge toward the lower edge. Note that a thickness of any layer from among the skin layer 41, the core layer 31, the skin layer 42, the core layer 32, and the skin layer 43 may not change as long as the intermediate film is in the wedge shape as a whole, even in the case of the wedge-shaped intermediate film using the five-layer laminated film as same as the intermediate film 2C.

Usually, in such a laminated glass, the thickness of the intermediate film and each of the layers constituting the intermediate film is fixed from one end toward the other end of the upper edge, and the thickness of the intermediate film and each of the layers constituting the intermediate film is fixed from one end toward the other end of the lower edge.

In the laminated glass 10C, a place where the thickness of the intermediate film 2C is the largest is the upper edge. FIG. 3B illustrates measurement places of the distance Ta between the outermost core layers and the thickness Tb of the intermediate film 2C in the intermediate film 2C. In the intermediate film 2C, the similar thicknesses as the intermediate film 2A can be applied as Ta and Tb measured at the upper edge. The similar thicknesses as the intermediate film 2A can be applied to the thicknesses at the upper edge being the place where the thicknesses are the largest regarding thicknesses of the respective layers in the intermediate film 2C similar to Ta and Tb.

Meanwhile, the thickness of the intermediate film 2C in the laminated glass 10C may not be constant in a change ratio of the thickness from the lower edge toward the upper edge, and the change ratio of the thickness may change. For example, a case when the thickness of the intermediate film 2C does not change in a middle from the lower edge toward the upper edge is included, or a constitution where the thickness of the intermediate film 2C gradually increases and gradually decreases in a middle from the lower edge toward the upper edge is also included.

In the laminated glass, generally, the intermediate film is sometimes used while partially extended according to the shape of the principal surface of the laminated glass. In this case, the thickness of the intermediate film at the extended part becomes smaller than the thickness of the intermediate film at a not-extended part. There is also a case when a plurality of block-shaped intermediate films having different thicknesses are combined to be used as one intermediate film. Also in this case, the thickness of each layer, the distance Ta between the outermost core layers, and the thickness Tb of the intermediate film are designed such that the values each measured at the place where the thickness of the intermediate film is the largest fall within the range same as the range when each layer has the uniform thickness within the principal surface of the laminated glass, specifically, the range illustrated by using the intermediate films 2A and 2B, similar to the case of wedge-shaped intermediate film.

The intermediate film in the laminated glass of the present invention preferably has a storage modulus G' of $5.0 \times 10^4$ Pa or more, and more preferably $1.0 \times 10^5$ Pa or more measured at a frequency of 1 Hz and a temperature of 20° C. The storage modulus G' is an index indicating rigidity of the intermediate film, and when the storage modulus G' is within the above range, sufficient rigidity can be secured.

An upper limit of the storage modulus G' of the intermediate film is not particularly limited. However, when the storage modulus G' of the intermediate film becomes high, the sound insulating performance may be damaged. Besides, when the storage modulus G' of the intermediate film is too high, productivity may decrease such as needing a specific device in process of cutting or the like. Further, the intermediate film may become brittle and decreases in penetration resistance. Considering such points, the storage modulus G' of the intermediate film is preferably $1.0 \times 10^7$ Pa or less. Note that the storage modulus G' of the intermediate film in the present specification is a storage modulus in a dynamic viscoelasticity test measured under conditions at a frequency of 1 Hz, a temperature of 20° C., and a swing angle gamma of 0.015% by a shearing method by using, for example, Rheometer MCR 301 manufactured by Anton Paar Co., Ltd.

[Laminated Glass]

The laminated glass of the present invention includes a pair of glass plates facing each other, and the intermediate film having the aforementioned constitution sandwiched between the pair of glass plates, where the intermediate film mass % is 14 mass % or more, and preferably within the aforementioned range. The surface density of the laminated glass is also as described above. In the present invention, the glass plates and the intermediate film are appropriately combined so that the intermediate film mass % and the surface density fall within the predetermined ranges or preferable ranges as the obtained laminated glass.

The laminated glass of the present invention has high sound insulating performance due to the aforementioned constitution. Specifically, the laminated glass of the present invention preferably has a loss factor of 0.4 or more at a primary resonance point measured in a frequency domain of 0 to 10000 Hz under the condition at a temperature of 20° C. Hereinafter, the primary resonance point refers to a primary resonance point measured in a frequency domain of 0 to 10000 Hz under the condition at a temperature of 20° C. unless otherwise specified.

Note that the loss factor at the primary resonance point can be measured by the central exciting method compliant with ISO_PAS_16940. As a measurement apparatus for the loss factor by the central exciting method, for example, Central Exciting Method Measurement Systems (MA-5500, DS-2000 (brand name)) manufactured by ONO SOKKI Co., Ltd. can be exemplified. The frequency domain of the primary resonance point in the laminated glass of the present invention is about 0 to 300 Hz. The laminated glass of the present invention, having the loss factor at the primary resonance point of 0.4 or more, can sufficiently insulate sound in a relatively low frequency domain, such as, for example, engine sound, vibration sound of tires and the like of an automobile. Further, the laminated glass of the present invention, having the loss factor at the primary resonance point of 0.4 or more, can efficiently insulate sound from a low frequency domain to a high frequency domain because the loss factors at higher-order resonance points such as a secondary resonance point to a seventh resonance point are likely to be relatively high, for example, 0.4 or more.

In the laminated glass of the present invention, the loss factor at the primary resonance point is more preferably 0.42 or more, and further preferably 0.45 or more. In the laminated glass of the present invention, the loss factors are particularly preferably 0.5 or more at both the primary resonance point and the secondary resonance point. Note that, for example, in a laminated glass in a curved shape, the loss factor is measured by fabricating a laminated glass using flat glass plates to have the constitution equivalent to that of the laminated glass in the curved shape.

Further, the laminated glass of the present invention preferably has a three point bend rigidity of 100 N/mm or more. The three point bend rigidity is rigidity obtained by a three point bend test, and can be measured by, for example, a compression tensile testing machine. The three point bend rigidity is particularly preferably 120 N/mm or more. The three point bend rigidity of the laminated glass of 100 N/mm or more is preferable because it is the rigidity at a level not inhibiting opening and closing the window glass during high-speed running of a vehicle.

The laminated glass of the present invention preferably has a sound transmission loss of 35 dB or more in a coincidence region measured compliant with SAE J1400, and particularly preferably 42 dB or more. The laminated glass having a sound transmission loss of 35 dB or more can be evaluated to be excellent in sound insulating property.

(Another Layer)

The laminated glass in the embodiment may have a functional film between the pair of glass plates as another layer within the range not impairing the effect of the present invention. When the functional film is included, for example, a constitution where the functional film is sandwiched between the layers of the intermediate film constituted by the plurality of layers as stated above is preferable.

As the functional film, there can be cited, for example, an infrared cut film, a conductive film, a light control film, and so on. As the infrared cut film, specifically, there can be cited the one in which a conventionally known infrared reflective film such as an infrared reflective film having a film thickness of about 100 to 500 nm and including a dielectric multilayer film, a liquid crystal alignment film, an infrared reflector-containing coating film, and a single-layer or multilayer infrared reflective film including a metal film is formed on a supporting film such as a PET film having a thickness of about 25 to 200 μm or the like. As the infrared cut film, there can be cited a dielectric multilayer film, or the like made by laminating resin films different in refractive index and having a total film thickness of about 25 to 200 μm. As the conductive film, there can be cited one where a transparent conductive film such as ITO or a conductive thin metal wire pattern is formed on a supporting film made of a resin, and so on. As the light control film, there can be cited a liquid-crystal, an SPD (suspended particle device), and so on. Two or more of the functional films may be used together.

When the laminated glass of the present invention includes the functional film, and the functional film exists between the outermost core layers, the distance Ta between the outermost core layers and the surface density between the outermost core layers are measured and calculated under a state where the functional film is included. The thickness Tb of the intermediate film and the intermediate film mass % are measured and calculated while the functional film is excluded, and the surface density of the laminated film is calculated under the state where the functional film is included.

The laminated glass of the present invention may have, for example, a black ceramic layer arranged in a band shape at a part or all of a peripheral edge portion of the laminated glass as another layer for a purpose of hiding portions attached to a frame body or the like of the laminated glass, a wiring conductor and so on. A width of the black ceramic layer is appropriately selected according to purposes of the laminated glass. For example, when the laminated glass is roof glass used for a ceiling part of an automobile, the black ceramic layer is usually formed in a frame shape having a width of about 10 to 100 mm. When the laminated glass is used for side glass of the automobile, the black ceramic layer is sometimes formed in a band shape usually having a width of about 30 to 200 mm.

The black ceramic layer can be formed into the above-described shape by an ordinary method on the principal surface on the atmosphere side or the intermediate film side of either one of the pair of glass plates included in the laminated glass. The formation place of the black ceramic layer is appropriately selected according to the use. Note that when the laminated glass of the present invention includes the black ceramic layer, the thickness Tb of the intermediate film and the intermediate film mass % are measured and calculated while excluding the black ceramic layer, and the surface density of the laminated glass is calculated under a state where the black ceramic layer is not included.

Note that "black" of the black ceramic layer does not mean, for example, black defined by three attributes of color or the like, and includes a range where it is recognizable as black adjusted to inhibit visible light from being transmitted to an extent capable of hiding at least a portion required to be hidden. Accordingly, in the black ceramic layer, the black may have gradation as necessary, or the black may be slightly different from the black defined by three attributes of color, within a range in which the black can fulfill the function. From the same viewpoint, the black ceramic layer may be configured to be an integrated film in which the whole layer continues or may be formed of dot patterns or the like in which the percentage of visible light transmission can be easily adjusted by the setting of the shape, arrangement or the like, according to the place where the black ceramic layer is arranged.

The laminated glass of the present embodiment may have a shade region. When the laminated glass is laminated glass for a vehicle, in particular, a windshield, a band-shaped shade region is sometimes formed which is colored in green, blue, and so on for improvement of antiglare property, heat shielding property and so on. The shade region is sometimes provided on the surface of the glass plate, and also often formed by coloring the intermediate film in a band shape. On the other hand, since there is a legal visual field area where the visible light transmittance should be set to a predetermined value or more (for example, 70% or more), the shade region of the windshield is usually arranged on an upper portion of the windshield that is outside the visual field area.

[Manufacture of Laminated Glass]

The laminated glass in the embodiment of the present invention can be manufactured by a generally used publicly-known technology. In the laminated glass 10A, the intermediate film 2A in which the skin layer 41, the core layer 31, the skin layer 42, the core layer 32, and the skin layer 43 are laminated in this order is fabricated as described above or the intermediate film 2A is fabricated by coextrusion in forming the layers, and the intermediate film 2A is inserted between the pair of glass plates 1A and 1B to prepare a laminated glass precursor being laminated glass before compression bonding in which the glass plate 1A, the intermediate film 2A (where, the skin layer 41 is located on the glass plate 1A side), and the glass plate 1B are laminated in this order. Also in the case of having another layer, the glass plates and the layers are laminated in the similar lamination order to that of similarly obtained laminated glass to prepare a laminated glass precursor.

The laminated glass precursor is put in a vacuum bag such as a rubber bag, the vacuum bag is connected to an exhaust system, and the laminated glass precursor is subjected to bonding at a temperature of about 70 to 110° C. while pressure-reduction suction (deaeration) is being performed to bring the inside of the vacuum bag into a pressure reduction degree of about −65 to −100 kPa, whereby the laminated glass in the embodiment can be obtained. The laminated glass precursor after above bonding treatment is further subjected, for example, to compression bonding by heating and pressurizing under conditions of 100 to 140° C. and a pressure of 0.6 to 1.3 MPa, whereby laminated glass further excellent in durability can be obtained.

The use of the laminated glass of the present invention is not particularly limited. The laminated glass can be used as a laminated glass for building, a laminated glass for an automobile and the like, and can attain more prominent sound insulating effect when it is used as the laminated glass for an automobile. Further, the reduction in weight can be attained in preferable aspect.

Note that the laminated glass of the present invention, when used for an automobile, preferably has a visible light transmittance of 70% or more, and more preferably 74% or more measured according to JIS R3212 (1998). Tts (total solar energy transmitted through a glazing) measured according to ISO13837-2008 is preferably 66% or less, and more preferably 60% or less.

EXAMPLES

Hereinafter, the present invention will be described in more detail using examples. The present invention is not limited to the embodiments and examples described below. Examples 1 to 21 are examples, and Examples 22 to 39 are comparative examples.

Example 1 to Example 39

Laminated glasses of Example 1 to Example 39 having constitutions listed in Tables 1-1 and 1-2 were manufactured as described below and evaluated. In Tables 1-1 and 1-2, an outer plate and an inner plate of glass plates respectively mean a glass plate disposed on a vehicle-exterior side and a glass plate disposed on a vehicle-interior side when, for example, it is used as glass for an automobile. However, use methods of the laminated glasses of Example 1 to Example 39 are not limited.

[Manufacture or Prepare of Intermediate Film]

The intermediate film in a laminated constitution listed in Tables 1-1 and 1-2 was manufactured or prepared in each example. Note that the same PVB sheet (Tgs; 30° C.) except the thickness was used for every skin layer in the intermediate film. Besides, the PVB sheet (Tgc; 3° C.) having a thickness of 0.1 mm was used for every core layer. In a column of the "laminated constitution" in Tables 1-1 and 1-2, a numeric character indicates the thickness of the skin layer [mm], and "c" indicates the core layer.

For example, the laminated constitution of the intermediate film of the laminated glass of Example 1 is indicated as "0.76/c/0.2/c/0.2/c/0.96". The laminated glass of Example 1 has the same constitution as the laminated glass 10B illustrated in FIG. 2, and for example, has a constitution having the glass plate 1B as the outer plate, the glass plate 1A as the inner plate, and the intermediate film 2B where the skin layer 44 with the thickness of 0.76 mm, the core layer 33 with the thickness of 0.1 mm, the skin layer 43 with the thickness of 0.2 mm, the core layer 32 with the thickness of 0.1 mm, the skin layer 42 with the thickness of 0.2 mm, the core layer 31 with the thickness of 0.1 mm, and the skin layer 41 with the thickness of 0.96 mm are laminated from the outer plate 1B side toward the inner plate 1A side with the plate thicknesses listed in Tables 1-1 and 1-2.

The intermediate film in each example was manufactured by laminating the PVB sheets forming the layers and pressing them by a hot press forming machine at 150° C., for 300 seconds, at a press pressure of 50 kg/cm². The thickness of each layer is the thickness after the pressing.

The intermediate film of the laminated glass of Example 1 has three core layers, and the distance Ta between the outermost core layers is a sum of the thicknesses of the skin layer 43, the core layer 32, and the skin layer 42 of 0.2+0.1+0.2=0.5 mm. The surface density between the outermost core layers is 0.55 kg/m². The thickness Tb of the intermediate film is 2.42 mm which is a sum of the thicknesses of the respective layers of (0.76+0.1+0.2+0.1+0.2+0.1+0.96).

[Manufacture of Laminated Glass]

The intermediate film which was manufactured or prepared as described above in each example was laminated between the glass plates (outer plate, inner plate) with the plate thicknesses listed in Tables 1-1 and 1-2 to be sandwiched, then for example, the glass plate 1A, the intermediate film 2B, and the glass plate 1B were laminated to be the similar constitution as the laminated glass 10B in FIG. 2 in the laminated glass of Example 1, the laminate was put in a vacuum bag and subjected to compression bonding at 110° C. while deaeration was being performed to bring the inside of the vacuum bag into a pressure reduction degree of −60 kPa, and then subjected to further compression bonding by heating and pressurizing under conditions at a temperature of 140° C. and a pressure of 1.3 MPa, whereby the laminated glass was obtained. Note that all of the used glass plates were glass plates (25 mm×300 mm) made of soda lime glass, and the intermediate film was used for lamination by making a size into the same size as the glass plates in advance.

The number of core layers of the intermediate film, the distance Ta between the outermost core layers, the surface density between the outermost core layers, the thickness Tb of the intermediate film, the surface density of the laminated glass, and the intermediate film mass % in the laminated glass obtained in each example are listed in Tables 1-1 and 1-2.

(Evaluation)

The sound insulating property and the rigidity of the laminated glass obtained in each of Example 1 to Example 39 were measured as described below. Results thereof are listed in Tables 2-1 and 2-2.

(1) Sound Insulating Property

Regarding the obtained laminated glass, the loss factors at the primary resonance point to the seventh resonance point at a frequency of 0 to 10000 Hz, and at a temperature of 20° C. were measured based on ISO_PAS_16940, by using the Central Exciting Method Measurement Systems (MA-5500, DS-2000) manufactured by ONO SOKKI Co., Ltd.

(2) Rigidity

Regarding the obtained laminated glass, moduli at the primary resonance point to the seventh resonance point at a frequency of 0 to 10000 Hz, and at a temperature of 20° C. were measured similar to (1). In Tables 2-1 to 2-2 "1st", "2nd", "3rd", "4th", "5th", "6th", "7th" means primary resonance point, secondary resonance point, tertiary resonance point, fourth resonance point, fifth resonance point, sixth resonance point, and seventh resonance point respectively.

TABLE 1-1

| | Glass plate thickness [mm] | | Laminated constitution | Intermediate film | | | | Laminated glass | |
|---|---|---|---|---|---|---|---|---|---|
| | | | | | Between outermost core layers | | | | |
| Example | Outer plate | Inner plate | (c indicates core layer, numeric character indicates skin layer thickness [mm]) | Number of core layers | Distance Ta [mm] | Surface density [kg/m²] | Total Thickness Tb [mm] | Surface density [kg/m²] | Intermediate film mass % |
| 1 | 2.0 | 1.3 | 0.76/c/0.2/c/0.2/c/0.96 | 3 | 0.50 | 0.55 | 2.42 | 10.91 | 24.4 |
| 2 | 2.0 | 2.0 | 0.33/c/0.66/c/0.33 | 2 | 0.66 | 0.73 | 1.52 | 11.67 | 14.3 |
| 3 | 2.0 | 1.6 | 0.33/c/0.66/c/0.33 | 2 | 0.66 | 0.73 | 1.52 | 10.67 | 15.7 |
| 4 | 2.0 | 1.3 | 0.33/c/0.66/c/0.33 | 2 | 0.66 | 0.73 | 1.52 | 9.92 | 16.9 |
| 5 | 2.0 | 1.3 | 0.33/c/0.66/c/1.09 | 2 | 0.66 | 0.73 | 2.28 | 10.76 | 23.3 |
| 6 | 2.0 | 1.3 | 1.09/c/0.66/c/0.33 | 2 | 0.66 | 0.73 | 2.28 | 10.76 | 23.3 |
| 7 | 2.0 | 2.0 | 0.2/c/0.4/c/0.4/c/0.2 | 3 | 0.90 | 0.99 | 1.50 | 11.68 | 14.4 |
| 8 | 2.0 | 2.0 | 0.2/c/0.4/c/0.4/c/0.2 | 3 | 0.90 | 0.99 | 1.50 | 11.68 | 14.4 |
| 9 | 2.0 | 1.3 | 0.2/c/0.4/c/0.4/c/0.2 | 3 | 0.90 | 0.99 | 1.50 | 9.93 | 16.9 |
| 10 | 2.0 | 2.0 | 0.2/c/0.4/c/0.4/c/0.4/c/0.2 | 4 | 1.40 | 1.54 | 2.00 | 12.24 | 18.3 |
| 11 | 2.0 | 1.3 | 0.2/c/0.4/c/0.4/c/0.4/c/0.2 | 4 | 1.40 | 1.54 | 2.00 | 10.49 | 21.4 |
| 12 | 2.0 | 1.3 | 0.33/c/1.42/c/0.33 | 2 | 1.42 | 1.56 | 2.28 | 10.76 | 23.3 |
| 13 | 2.0 | 2.0 | 0.33/c/0.66/c/0.66/c/0.33 | 3 | 1.42 | 1.56 | 2.28 | 12.51 | 20.1 |
| 14 | 2.0 | 1.3 | 0.33/c/0.66/c/0.66/c/0.33 | 3 | 1.42 | 1.56 | 2.28 | 10.76 | 23.3 |

TABLE 1-1-continued

| | Glass plate thickness [mm] | | Intermediate film | | Between outermost core layers | | | Laminated glass | |
|---|---|---|---|---|---|---|---|---|---|
| Example | Outer plate | Inner plate | Laminated constitution (c indicates core layer, numeric character indicates skin layer thickness [mm]) | Number of core layers | Distance Ta [mm] | Surface density [kg/m²] | Total Thickness Tb [mm] | Surface density [kg/m²] | Intermediate film mass % |
| 15 | 2.0 | 1.3 | 0.2/c/0.96/c/0.58/c/0.2 | 3 | 1.64 | 1.80 | 2.24 | 10.76 | 23.3 |
| 16 | 2.0 | 1.1 | 0.2/c/0.4/c/0.53/c/0.53/c/0.4/c/0.2 | 5 | 1.90 | 2.09 | 2.50 | 10.83 | 28.4 |
| 17 | 2.0 | 1.1 | 0.2/c/0.4/c/0.4/c/0.4/c/0.4/c/0.2 | 5 | 1.90 | 2.09 | 2.50 | 10.56 | 26.6 |
| 18 | 2.0 | 2.0 | 0.33/c/0.66/c/0.66/c/0.66/c/0.33 | 4 | 2.18 | 2.40 | 3.04 | 13.34 | 25.1 |
| 19 | 1.8 | 1.1 | 0.33/c/0.66/c/0.66/c/0.66/c/0.33 | 4 | 2.18 | 2.40 | 3.04 | 10.59 | 31.6 |
| 20 | 1.8 | 1.1 | 0.2/c/0.4/c/0.4/c/0.4/c/0.4/c/0.4/c/0.2 | 6 | 2.40 | 2.64 | 3.00 | 10.62 | 31.7 |
| 21 | 1.8 | 1.1 | 0.33/c/0.66/c/0.66/c/0.66/c/0.66/c/0.33 | 5 | 2.94 | 3.23 | 3.80 | 11.43 | 36.6 |
| 22 | 2.0 | 1.3 | 0.33/0.33 | 1 | 0.00 | 0.00 | 0.76 | 9.09 | 9.2 |
| 23 | 2.0 | 2.0 | 0.76 | 0 | 0.00 | 0.00 | 0.76 | 10.84 | 7.7 |
| 24 | 2.0 | 2.0 | 1.52 | 0 | 0.00 | 0.00 | 1.52 | 11.67 | 14.3 |
| 25 | 2.0 | 2.0 | 2.28 | 0 | 0.00 | 0.00 | 2.28 | 12.51 | 20.1 |
| 26 | 2.0 | 2.0 | 0.33/0.33 | 1 | 0.00 | 0.00 | 0.76 | 10.84 | 7.7 |
| 27 | 2.0 | 2.0 | 0.2/c/0.2 | 1 | 0.00 | 0.00 | 0.50 | 10.56 | 5.3 |
| 28 | 2.0 | 2.0 | 1.55 | 0 | 0.00 | 0.00 | 1.55 | 11.67 | 14.3 |
| 29 | 2.0 | 2.0 | 0.71/c/0.71 | 1 | 0.00 | 0.00 | 1.52 | 11.67 | 14.3 |
| 30 | 0.5 | 0.5 | 0.33/c/0.33 | 1 | 0.00 | 0.00 | 0.76 | 3.34 | 25.1 |
| 31 | 1.1 | 1.1 | 0.33/c/0.33 | 1 | 0.00 | 0.00 | 0.76 | 6.34 | 13.2 |
| 32 | 2.0 | 2.0 | 0.58/c/0.58 | 1 | 0.00 | 0.00 | 1.26 | 11.40 | 12.3 |
| 33 | 2.0 | 2.0 | 0.2/c/0.96 | 1 | 0.00 | 0.00 | 1.26 | 11.40 | 12.3 |
| 34 | 2.0 | 1.3 | 1.09/c/1.09 | 1 | 0.00 | 0.00 | 2.28 | 10.76 | 23.3 |
| 35 | 2.0 | 1.3 | 1.85/c/0.33 | 1 | 0.00 | 0.00 | 2.28 | 10.76 | 23.3 |
| 36 | 2.0 | 1.3 | 0.33/c/1.85 | 1 | 0.00 | 0.00 | 2.28 | 10.76 | 23.3 |
| 37 | 2.0 | 1.3 | 0.2/c/0.2 | 1 | 0.00 | 0.00 | 0.50 | 8.81 | 6.4 |
| 38 | 2.0 | 2.0 | 0.2/c/0.4/c/0.2 | 2 | 0.40 | 0.44 | 1.00 | 11.12 | 10.1 |
| 39 | 2.0 | 1.3 | 0.2/c/0.4/c/0.2 | 2 | 0.40 | 0.44 | 1.00 | 9.37 | 12.0 |

TABLE 2-1

| | Loss factor | | | | | | | Modulus [×10¹⁰ Pa] | | | | | | |
|---|---|---|---|---|---|---|---|---|---|---|---|---|---|---|
| Example | 1st | 2nd | 3rd | 4th | 5th | 6th | 7th | 1st | 2nd | 3rd | 4th | 5th | 6th | 7th |
| 1 | 0.45 | 0.44 | 0.35 | | | | | 1.97 | 1.22 | 1.00 | | | | |
| 2 | 0.40 | 0.42 | 0.42 | 0.43 | 0.37 | 0.30 | | 3.41 | 2.14 | 1.74 | 1.43 | 1.22 | 1.05 | |
| 3 | 0.43 | 0.45 | 0.26 | | | | | 79.80 | 41.30 | 41.90 | | | | |
| 4 | 0.40 | 0.42 | 0.40 | 0.46 | | | | 3.49 | 2.18 | 1.75 | 1.51 | | | |
| 5 | 0.40 | 0.45 | 0.52 | | | | | 3.27 | 1.97 | 1.63 | | | | |
| 6 | 0.41 | 0.46 | | | | | | 3.04 | 1.82 | | | | | |
| 7 | 0.45 | 0.35 | 0.37 | 0.36 | 0.30 | 0.24 | 0.19 | 2.58 | 1.60 | 1.25 | 1.14 | 1.01 | 0.93 | 0.87 |
| 8 | 0.45 | 0.37 | 0.38 | 0.38 | 0.32 | 0.26 | 0.19 | 2.57 | 1.59 | 1.25 | 1.12 | 1.01 | 0.91 | 0.84 |
| 9 | 0.42 | 0.36 | 0.47 | 0.38 | 0.30 | 0.24 | 0.22 | 2.59 | 1.64 | 1.46 | 1.16 | 1.02 | 0.94 | 0.87 |
| 10 | 0.50 | 0.34 | 0.47 | 0.37 | 0.29 | 0.25 | 0.19 | 2.04 | 1.29 | 1.02 | 0.86 | 0.78 | 0.73 | 0.66 |
| 11 | 0.47 | 0.44 | 0.46 | 0.46 | 0.38 | 0.29 | 0.26 | 2.25 | 1.38 | 1.11 | 0.93 | 0.81 | 0.72 | 0.66 |
| 12 | 0.40 | 0.47 | | | | | | 3.05 | 1.86 | | | | | |
| 13 | 0.47 | 0.48 | | | | | | 2.53 | 1.60 | | | | | |
| 14 | 0.47 | 0.49 | | | | | | 2.58 | 1.61 | | | | | |
| 15 | 0.47 | 0.47 | 0.50 | 0.51 | | | | 2.15 | 1.31 | 1.01 | 0.84 | | | |
| 16 | 0.52 | 0.49 | 0.22 | | | | | 1.76 | 1.12 | 0.84 | | | | |
| 17 | 0.50 | 0.49 | 0.35 | | | | | 1.91 | 1.20 | 1.01 | | | | |
| 18 | 0.54 | 0.53 | | | | | | 2.03 | 1.28 | | | | | |
| 19 | 0.53 | 0.51 | | | | | | 2.00 | 1.33 | | | | | |
| 20 | 0.55 | 0.49 | | | | | | 1.60 | 1.02 | | | | | |
| 21 | 0.51 | 0.65 | | | | | | 1.67 | 1.10 | | | | | |
| 22 | 0.25 | 0.33 | 0.30 | 0.31 | 0.32 | 0.23 | | 4.95 | 3.42 | 3.06 | 2.59 | 2.27 | 1.98 | |
| 23 | 0.02 | 0.06 | 0.08 | 0.09 | 0.09 | 0.09 | | 6.77 | 5.43 | 4.36 | 3.49 | 2.88 | 2.44 | |
| 24 | 0.04 | 0.09 | 0.11 | 0.11 | 0.10 | 0.10 | | 6.23 | 4.23 | 3.08 | 2.30 | 1.82 | 1.50 | |
| 25 | 0.06 | 0.12 | 0.13 | 0.13 | 0.12 | 0.11 | | 5.63 | 3.34 | 2.30 | 1.65 | 1.27 | 1.03 | |
| 26 | 0.27 | 0.33 | 0.38 | 0.33 | 0.32 | 0.25 | | 4.73 | 3.15 | 2.93 | 2.34 | 2.02 | 1.77 | |
| 27 | 0.26 | 0.32 | 0.38 | 0.41 | 0.31 | 0.28 | | 4.79 | 3.28 | 3.05 | 2.70 | 2.23 | 1.99 | |
| 28 | 0.03 | 0.08 | 0.10 | 0.10 | 0.10 | 0.10 | | 6.33 | 4.39 | 3.23 | 2.41 | 1.91 | 1.57 | |
| 29 | 0.28 | 0.34 | 0.32 | 0.34 | 0.27 | 0.26 | | 4.55 | 2.89 | 2.44 | 1.88 | 1.50 | 1.29 | |
| 30 | 0.20 | 0.15 | 0.01 | 0.15 | 0.02 | | | 4.88 | 3.07 | 3.36 | 3.95 | 5.18 | | |
| 31 | 0.25 | 0.21 | 0.20 | 0.10 | | | | 4.88 | 3.35 | 3.34 | 2.47 | | | |
| 32 | 0.27 | 0.37 | 0.33 | 0.33 | | | | 4.70 | 3.04 | 2.57 | 2.03 | | | |
| 33 | 0.33 | 0.38 | 0.41 | 0.35 | 0.32 | 0.26 | | 4.03 | 2.54 | 2.19 | 1.71 | 1.46 | 1.28 | |
| 34 | 0.31 | 0.38 | 0.40 | | | | | 3.78 | 2.24 | 1.82 | | | | |

TABLE 2-1-continued

| Example | Loss factor | | | | | | | Modulus [×10$^{10}$ Pa] | | | | | | |
|---|---|---|---|---|---|---|---|---|---|---|---|---|---|---|
| | 1st | 2nd | 3rd | 4th | 5th | 6th | 7th | 1st | 2nd | 3rd | 4th | 5th | 6th | 7th |
| 35 | 0.31 | 0.39 | 0.37 | | | | | 3.88 | 2.32 | 1.87 | | | | |
| 36 | 0.30 | 0.37 | 0.38 | | | | | 3.97 | 2.36 | 1.89 | | | | |
| 37 | 0.25 | 0.34 | 0.37 | 0.41 | 0.28 | 0.26 | 0.23 | 4.75 | 3.38 | 3.15 | 2.83 | 2.38 | 2.20 | 1.98 |
| 38 | 0.38 | 0.39 | 0.38 | 0.38 | 0.30 | 0.25 | | 3.37 | 2.17 | 1.83 | 1.59 | 1.42 | 1.27 | |
| 39 | 0.36 | 0.38 | 0.45 | 0.40 | 0.29 | 0.25 | 0.21 | 3.32 | 2.14 | 1.91 | 1.60 | 1.40 | 1.32 | 1.25 |

It is obvious from Tables 2-1 and 2-2 that the laminated glasses of Examples are excellent in the sound insulating property.

What is claimed is:

1. A laminated glass comprising:
a pair of glass plates facing each other; and
an intermediate film sandwiched between the pair of glass plates, including alternately laminated at least one skin layer and two or more core layers,
wherein
the intermediate film includes the at least one skin layer to be in contact with facing surfaces of the pair of glass plates, and a distance Ta between a pair of the core layers which are the closest to the pair of glass plates is 0.45 mm or more,
the skin layer has a glass transition point of 15° C. or higher, and each of the core layers has a glass transition point of less than 15° C.,
the skin layer has a thickness of 0.15 to 1.1 mm, and
a ratio of a mass of the intermediate film with respect to a total mass of the intermediate film and the pair of glass plates is 14 mass % or more.

2. The laminated glass according to claim 1, wherein the intermediate film includes the at least one skin layer to be in contact with the facing surfaces of the pair of glass plates, and a surface density of whole layers disposed between a pair of the core layers which are the closest to the pair of glass plates is 0.5 kg/m$^2$ or more.

3. The laminated glass according to claim 1, wherein the intermediate film includes three or more core layers.

4. The laminated glass according to claim 1, wherein the laminated glass is for an automobile,
a thickness of a glass plate on a vehicle exterior side is 1.6 to 2.5 mm, and
a thickness of a glass plate on a vehicle interior side is 0.5 to 1.6 mm.

5. The laminated glass according to claim 1, wherein a thickness Tb of the intermediate film is 1.53 mm or more.

6. The laminated glass according to claim 1, wherein a surface density of the laminated glass is 12 kg/m$^2$ or less.

7. The laminated glass according to claim 1, wherein a loss factor at a primary resonance point measured in a frequency domain of 0 to 10000 Hz at a temperature of 20° C. is 0.4 or more.

8. The laminated glass according to claim 1, wherein the total number of core layers ranges from 2 to 6.

9. The laminated glass according to claim 1, wherein a distance Ta between the outermost core layers ranges from 0.45 to 4.0 mm.

10. The laminated glass according to claim 1, wherein a distance Ta between the outermost core layers ranges from 0.5 to 2.94 mm.

11. The laminated glass according to claim 1, wherein a thickness Tb of the sum of the thicknesses of the core layers and the at least one skin layer ranges from 1.5 to 4.0 mm.

12. The laminated glass according to claim 1, wherein a thickness Tb of the sum of the thicknesses of the core layers and the at least one skin layer ranges from 1.50 to 3.80 mm.

13. The laminated glass according to claim 1, wherein each core layer thickness ranges from 0.05 to 0.2 mm.

14. The laminated glass according to claim 1, wherein each skin layer has a thickness of 0.2 to 1.09 mm.

15. The laminated glass according to claim 1, wherein an outermost core layer in the intermediate layer surface density ranges from 0.5 to 3.3 kg/m$^2$.

16. The laminated glass according to claim 1, wherein an outermost core layer in the intermediate layer surface density ranges from 0.55 to 3.23 kg/m$^2$.

17. The laminated glass according to claim 1, wherein a surface density of the laminated glass ranges from 8 to 13.5 kg/m$^2$.

18. The laminated glass according to claim 1, wherein a surface density of the laminated glass ranges from 9.92 to 13.34 kg/m$^2$.

19. The laminated glass according to claim 1, wherein a ratio of a mass of the intermediate film with respect to a total mass of the intermediate film and the pair of glass plates mass % ranges from 14 mass % to 50 mass %.

20. The laminated glass according to claim 1, wherein a ratio of a mass of the intermediate film with respect to a total mass of the intermediate film and the pair of glass plates mass % ranges from 14.3 mass % to 36.6 mass %.

* * * * *